(12) United States Patent
Tang et al.

(10) Patent No.: US 10,306,119 B2
(45) Date of Patent: May 28, 2019

(54) OPHTHALMIC LENS CENTRING-BLOCKING APPARATUS

(71) Applicant: ESSILOR INTERNATIONAL (COMPAGNIE GENERALE D'OPTIQUE), Charenton-le-pont (FR)

(72) Inventors: David C Tang, Charenton-le-pont (FR); Guilhem Escalier, Charenton-le-pont (FR); Stephane Boutinon, Charenton-le-pont (FR); Michel Nauche, Charenton-le-pont (FR); Leonard Hartmann, Charenton-le-pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 144 days.

(21) Appl. No.: 15/321,478

(22) PCT Filed: Jun. 23, 2015

(86) PCT No.: PCT/FR2015/051673
§ 371 (c)(1),
(2) Date: Dec. 22, 2016

(87) PCT Pub. No.: WO2015/197970
PCT Pub. Date: Dec. 30, 2015

(65) Prior Publication Data
US 2017/0163857 A1    Jun. 8, 2017

(30) Foreign Application Priority Data

Jun. 23, 2014  (FR) ..................................... 14 55813

(51) Int. Cl.
*H04N 5/225* (2006.01)
*G01M 11/02* (2006.01)
*G02C 13/00* (2006.01)
*B24B 13/005* (2006.01)

(52) U.S. Cl.
CPC ....... *H04N 5/2254* (2013.01); *B24B 13/0055* (2013.01); *G01M 11/0214* (2013.01); *G02C 13/003* (2013.01); *G02C 13/005* (2013.01)

(58) Field of Classification Search
CPC .................................................. H04N 5/2254
USPC ....................................................... 348/335
See application file for complete search history.

(56) References Cited

U.S. PATENT DOCUMENTS 3,134,208 A    5/1964   Richmond

FOREIGN PATENT DOCUMENTS

| DE | 369 538 C | 2/1923 |
| EP | 0 363 281 A2 | 4/1990 |
| EP | 0 866 355 A1 | 9/1998 |
| GB | 1 164 732 A | 9/1969 |

OTHER PUBLICATIONS

International Search Report, dated Sep. 7, 2015, from corresponding PCT application.

*Primary Examiner* — Joel W Fosselman
(74) *Attorney, Agent, or Firm* — Young & Thompson

(57) ABSTRACT

Disclosed is a centering-blocking apparatus (1) including: a frame (10); an ophthalmic lens holder (20); a blocking unit (30) suitable for receiving a blocking accessory (200) with a view to depositing it on the ophthalmic lens; and a centering unit (40) suitable for revealing a reference system of the ophthalmic lens. According to an embodiment, the blocking unit is fixedly mounted on the frame whereas the holder is movably mounted on the frame.

20 Claims, 2 Drawing Sheets

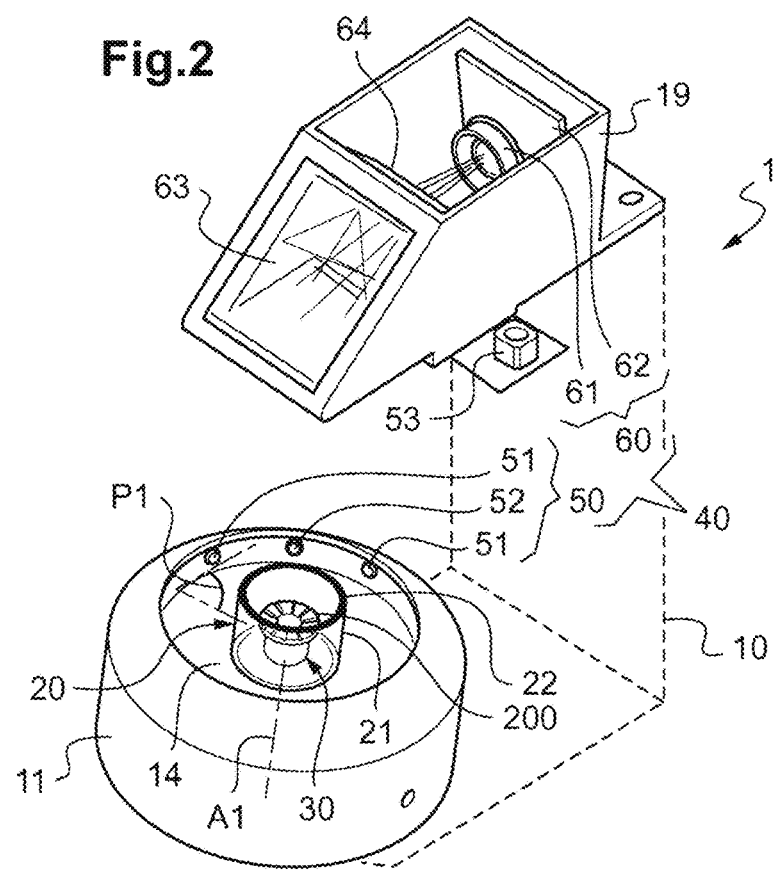
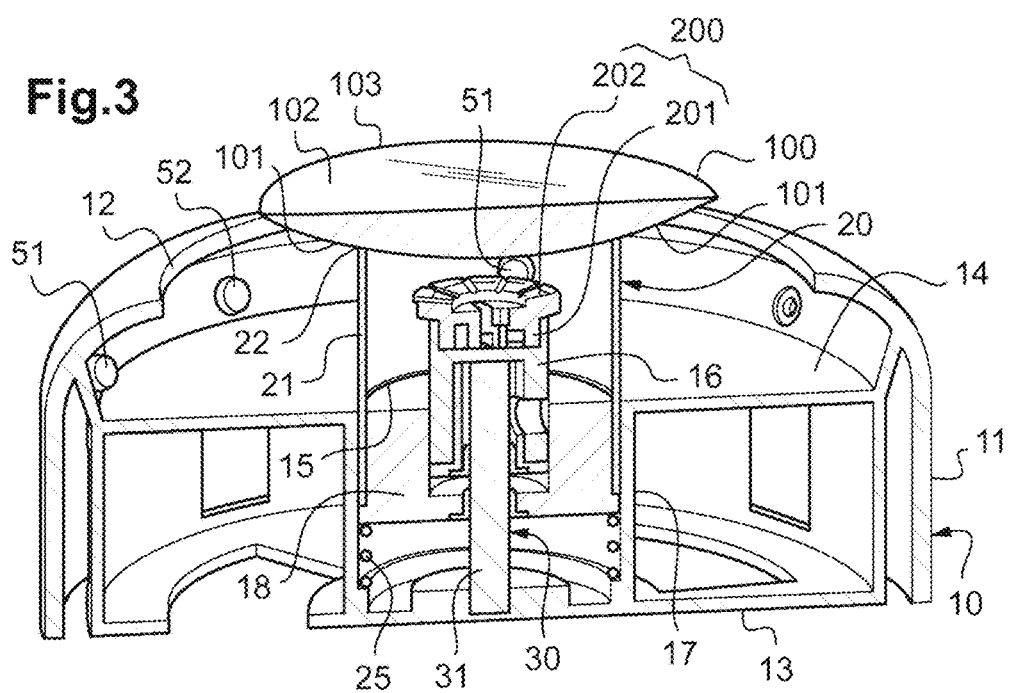

OPHTHALMIC LENS CENTRING-BLOCKING APPARATUS

TECHNICAL FIELD OF THE INVENTION

The present invention generally relates to the field of eyeglasses.

It more particularly relates to a centering-blocking apparatus including:
- a chassis,
- a holder mounted on the chassis, which is suitable for receiving an ophthalmic lens,
- blocking means mounted on the chassis, which are suitable for receiving a blocking accessory arranged to attach to the ophthalmic lens, and
- centering means mounted on the chassis, which include an objective for sighting the ophthalmic lens and which allow a frame of reference of the ophthalmic lens to be viewed.

PRIOR ART

The technical part of the work of an optician, which consists in mounting a pair of ophthalmic lenses in a spectacle frame selected by a customer, may be split into four main operations:
- the acquisition of the shapes of the outlines of the rims of the spectacle frame selected by the customer,
- the centering of each ophthalmic lens, which consists in determining the frame of reference of the lens using centering marks provided thereon, then in suitably positioning the outline of the rim acquired beforehand in the frame of reference of the lens so that, once edged to this outline then mounted in its frame, the lens is correctly positioned with respect to the corresponding eye of the customer and fulfils as best as possible the optical function for which it was designed,
- the blocking of each lens, which consists in attaching a blocking accessory to the lens, so that the lens can be easily extracted from the centering station and then be engaged in the edging station without loss of frame of reference, then
- the edging of each lens, which consists in machining this lens to the outline centered beforehand.

Here, the centering and blocking operations are more particularly of interest.

These operations are generally carried out by an optician, using a centering-blocking apparatus.

These apparatuses are generally configured in the same way, with means for holding the ophthalmic lens, optical means for centering the ophthalmic lens, and blocking means for depositing the blocking accessory on the lens.

A first exemplary centering-blocking apparatus is sold by the Applicant under the reference Delta. In this apparatus, the holder is provided to receive the lens with its convex front face oriented upward. The optical centering means include an eyepiece through which the optician may observe the lens superposed on a centering reticle, thereby allowing him to move the lens with respect to this reticle so as to center it correctly. The blocking means for their part include an arm that is movably mounted so as to be able to follow a rotational then translational path, and that is manually maneuverable so that the optician can force the arm to deposit the blocking accessory on the lens.

A second exemplary centering-blocking apparatus is sold by the Applicant under the reference Iness. In this apparatus, the holder is also provided to receive the lens with its convex front face oriented upward. The optical centering means include a video camera suitable for acquiring the frame of reference of the lens. The blocking means for their part include an automated movable arm, that allows the blocking accessory to be deposited in a desired position on the lens.

A third exemplary centering-blocking apparatus is sold by the company National Optronics under the reference 3B-Blocker. In this apparatus, the holder is this time provided to receive the lens with its convex front face oriented downward. The centering optical means include a projecting system located above the holder. The blocking means for their part include an arm located under the holder, and that is provided to retract from the field of the projecting system during the centering operation, then to move so as to press the blocking accessory against the lens from below during the blocking operation.

The major drawback common to all these centering-blocking apparatuses is that they all have a complex architecture, particularly as regards the blocking of the lens, to the point that their bulk and their cost prove to be high.

SUBJECT OF THE INVENTION

In order to remedy the aforementioned drawbacks of the prior art, the present invention provides an apparatus using a new method to deposit the blocking accessory on the ophthalmic lens.

More particularly, according to the invention a centering-blocking apparatus such as defined in the introduction is provided, wherein the blocking means and the holder are mounted so as to be able to move one with respect to the other, between a centering position (in which the ophthalmic lens is located a distance away from the blocking accessory), and a blocking position (in which the ophthalmic lens bears against the blocking accessory) and wherein the blocking means are located such that the blocking accessory remains in the image field of said sighting objective whatever the relative position of the blocking means with respect to the holder.

The blocking accessory is located opposite the ophthalmic lens with respect to the sighting objective. It therefore does not obstruct the sighting objective's view of the ophthalmic lens. It may therefore be left in the field of the sighting objective during the centering operation. Therefore, the blocking means may have a simplified architecture, since they will not need to be retracted from the field of the sighting objective during the centering operation. They must simply allow the blocking accessory to be deposited on the ophthalmic lens during the blocking operation.

By virtue of the invention, the centering-blocking apparatus may therefore have a simplified architecture, to the benefit of its bulk and its cost.

Preferably, the blocking means are fixedly mounted on the chassis and the holder is movably mounted on the chassis.

Thus, no arm movably mounted on the chassis for depositing the blocking accessory on the lens is provided, since it is the mobility of the holder that allows the lens to be brought into contact with the blocking accessory.

A simple movability of this holder allows it to provide this function with precision. It may be a question of a pivotability or preferably, a translatability.

The following are other advantageous and nonlimiting features of the centering-blocking apparatus according to the invention:
said holder is mounted on the frame so as to be translationally movable along a movement axis;

said holder defining a bearing plane for the ophthalmic lens, the centering means allow the ophthalmic lens borne by the holder to be observed along a viewing axis transverse to said bearing plane, said movement axis being parallel to said viewing axis;

an elastic element that is suitable for automatically returning the holder to the centering position, and the stiffness of which is such that it is possible to manually push the holder into the blocking position, is provided;

electronic means for controlling a mechanism for maneuvering the holder, which means are suitable for automatically controlling the movement of the holder between its centering position and its blocking position, are provided;

the holder is movable on the chassis into a loading third position, which is located opposite the centering position with respect to the blocking position;

said holder defining a bearing plane for the ophthalmic lens, said holder and said blocking means are located on the same side of the bearing plane;

the holder includes a cylindrical tube that has a free end edge suitable for receiving said ophthalmic lens;

the holder includes a bearing zone for the ophthalmic lens, which is produced from an anti-slip and anti-scratch material allowing, on the one hand, the ophthalmic lens to be manually moved on the holder, and, on the other hand, the ophthalmic lens to be fixedly maintained on the holder when the holder moves from its centering position to its blocking position;

most of the holder is produced from a transparent material;

the holder defining a bearing plane for the ophthalmic lens, the centering means include an objective that is located on a first side of the bearing plane, and first illuminating means that are located on the other side of the bearing plane;

first illuminating means that are distributed all around the holder so as to generate light of grazing incidence on one of the faces and/or on the edge face of the ophthalmic lens, are provided;

the first illuminating means include at least one source of light in the visible domain;

the first illuminating means include at least one source of light in the infrared domain;

the holder defining a bearing plane for the ophthalmic lens, the centering means include, on a first side of the bearing plane, an objective and second means for illuminating the ophthalmic lens;

the centering means include a video camera connected to a screen visible to the user;

the centering means include a sighting eyepiece; and a retractable backscattering accessory suitable for being placed between the holder and the ophthalmic lens is provided.

DETAILED DESCRIPTION OF ONE EXEMPLARY EMBODIMENT

The following description, which refers to the appended drawings, which are given by way of nonlimiting example, will allow the invention and how it may be carried out to be understood.

In the appended drawings:

FIG. 2 is a perspective view of the centering-blocking apparatus in FIG. 1; and FIG. 3 is a cross-sectional view of the holder and blocking means of the centering-blocking apparatus in FIG. 1.

FIGS. 1 and 2 show a centering-blocking apparatus 1.

Figure 1:
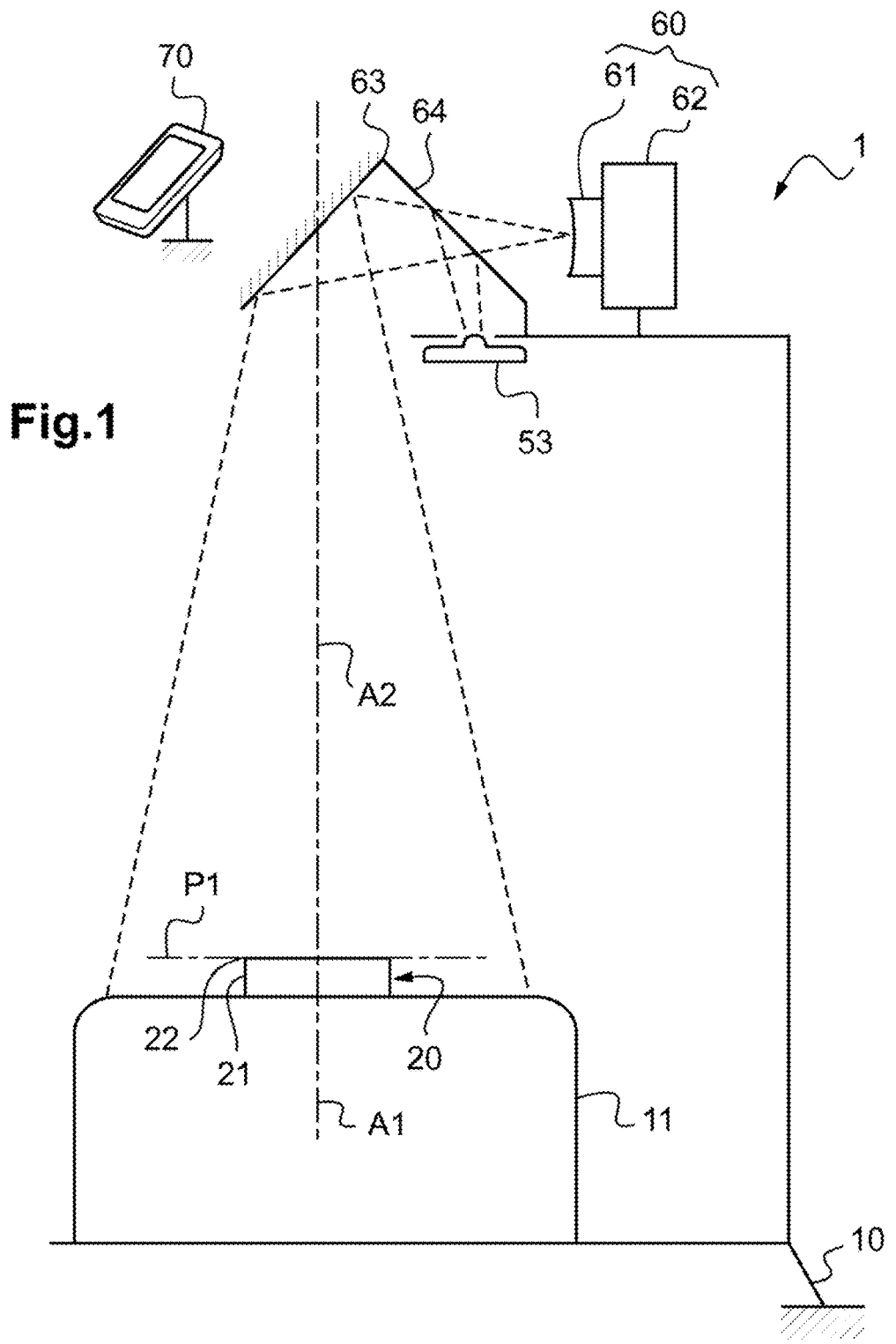
FIG. 1 is a schematic view of a centering-blocking apparatus according to the invention.

Such an apparatus is used by an optician to prepare an ophthalmic lens for edging to a given outline, with a view to mounting this ophthalmic lens in a spectacle frame selected by a customer.

This apparatus is generally used after the optician has acquired the shape of the outline to which the lens must be edged. This apparatus is then employed to carry out the operations of centering and blocking the ophthalmic lens.

The objective of the centering operation is to locate the frame of reference of the ophthalmic lens, and to determine the position that the aforementioned outline must occupy in this frame of reference so that the lens, once edged to this outline then mounted in the spectacle frame, is suitably centered facing the corresponding eye of the customer (in order to fulfil as best as possible the optical function for which it was designed).

The objective of the blocking operation is to place an accessory (called the "blocking accessory") on the ophthalmic lens, thereby, on the one hand, making it easier to pick up the lens in order to transport it from the centering-blocking apparatus 1 to an edging apparatus, and, on the other hand, to provide a stable coordinate system allowing the position of the frame of reference of the lens to be located after it has been transported.

As the cross-sectional view in FIG. 3 shows, the ophthalmic lens 100 to be edged has two optical faces (namely a convex front face 101 and a concave back face 102) and an edge face 103. The shapes of the front and back faces 101, 102 of this ophthalmic lens 100 are designed such that the lens has optical characteristics allowing defects in the vision of the customer to be corrected.

The ophthalmic lens 100 is furthermore provided with markings (not shown in the figures) allowing its frame of reference, called the "optical frame of reference", to be located.

These markings may take the form of temporary markings printed in ink and/or permanent markings engraved into the lens (micro-engravings are spoken of).

Provisional markings generally allow the optical frame of reference of the lens to be suitably located prior to its mounting in the spectacle frame whereas permanent markings allow the nature and characteristics of the ophthalmic lens to be identified and, after the provisional markings have been removed, the exact location of said lens to be identified or reestablished.

Here, provisional markings for determining the position and orientation of the lens will therefore more particularly be of interest.

Among these provisional markings, it will here more precisely be a question of:

an optical center point that conventionally corresponds, for a lens providing spherical power, to the point at which light rays are not deviated by the lens, or, for a progressive lens, to the "prism reference" point at which the nominal prismatic power of the ophthalmic lens 10 corresponding to the prescription of the wearer is measured, and the horizon lines marking the horizontal of the ophthalmic lens 100.

The objective of the centering-blocking apparatus 1 is then:

to allow the position of the optical frame of reference of the ophthalmic lens 100 to be located (this here amounting to locating the positions of the optical center point and of the horizon lines marked on the lens), and to place the blocking accessory on the ophthalmic lens 100, in a known position in this optical frame of reference (this here consisting in placing the blocking accessory on the axis of the optical center point, with its horizon indicators on the axis of the horizon lines of the lens).

As FIGS. 1 and 2 show, the centering-blocking apparatus 1 includes for this purpose at least:
a chassis 10,
a holder 20 mounted on the chassis 10 and suitable for receiving the ophthalmic lens 100,
blocking means 30 mounted on the chassis 10 and suitable for receiving the blocking accessory 200, and
centering means 40 mounted on the chassis 10, which include a sighting objective and which allow the optical frame of reference of the ophthalmic lens 100 to be viewed.

As will be described below, the sighting objective to be formed by the objective of a camera or a video camera or even by a sighting eyepiece.

Preferably, the centering means 40 are fixedly mounted on the chassis 10.

According to one particularly advantageous feature of the invention, the blocking means 30 and the holder 20 are mounted so as to be movable one with respect to the other and the blocking means 30 are located such that the blocking accessory 200 remains in the image field of said sighting objective 61 whatever the relative position of the blocking means 30 with respect to the holder 20.

Preferably, the blocking means 30 are fixedly mounted on the chassis 10, and it is the holder 20 that is movably mounted on the chassis 10.

Thus, after having been placed on the blocking means 30, the blocking accessory 200 is intended to remain immobile both during the operation of centering and during the operation of blocking the ophthalmic lens 100. In contrast, it is the ophthalmic lens 100 that will be moved to make contact with the blocking accessory 200 during the blocking operation.

The holder 20 of the ophthalmic lens 100 is then more precisely mounted so as to be movable between:
a centering position in which the ophthalmic lens 100 is located a distance away from the blocking accessory 200, and
a blocking position in which the ophthalmic lens 100 bears against the blocking accessory 200.

Advantageously, the holder 20 may also adopt an additional position called the loading position (located opposite the centering position with respect to the blocking position), which allows the loading of the blocking accessory 200 into the blocking means 30 to be facilitated. It may thus slide over a distance of about 1 centimeter.

In practice, the holder 20 is mounted on the chassis 10 so as to be able to slide along a movement axis A1 that here is vertical. Its centering position is therefore a (stable and/or lockable) high position, its loading position a (stable and/or lockable) low position, and its blocking position is an intermediate position.

Advantageously, the centering means 40 are intended to observe the ophthalmic lens 100 along a viewing axis A2 that is parallel (here coincident) with the movement axis A1. In this way, the (two-dimensional) position of the lens seen by the centering means 40 does not change when the holder 20 descends the ophthalmic lens 100 from its centering position to its blocking position.

The holder 20 has a high end via which it bears the ophthalmic lens 100 and that thus defines a bearing plane P1 for the ophthalmic lens 100.

In the embodiment shown in the figures, the holder 20 and the blocking means 30 are located on one and the same side of the bearing plane P1 (in practice under this bearing plane), whereas the objective of allowing the ophthalmic lens to be viewed is placed on the opposite side of this bearing plane P1 (above the latter).

As FIGS. 1 to 3 show, in the described embodiment, the chassis 10 includes a dome 11, here molded from a plastic.

As FIG. 3 shows, this dome 11 has a sidewall the top face of which is apertured with a large circular aperture 12 centered on the movement axis A1. It also includes a bottom 13 that lies in a horizontal plane and that closes the back of the sidewall. It lastly includes, at mid-height, a false bottom 14.

This false bottom 14 is visible through the large circular aperture 12. It has in its center a circular hole 15 centered on the movement axis A1. This circular hole 15 is bordered at the back by a duct 17 that extends between the bottom 13 and the false bottom 14.

As FIG. 3 shows, the blocking means 30 (which are designed to hold the blocking accessory 200) include a vertical shaft 31 that is centered on the movement axis A1 and housed inside this duct 17.

This vertical shaft 31 has a lower end that is secured (here forcibly) in a recessed blind hole provided in the upper face of the bottom 13 of the dome 11. It moreover has a free upper end that bears a socket 16 for accommodating the blocking accessory 200.

This socket 16 has a tubular shape. It is rigidly attached to the vertical shaft 31. It has a housing recessed into its upper face. This housing contains reliefs that are arranged in such a way that the socket 16 can accommodate the blocking accessory 200 only with a set orientation.

These reliefs here include, protruding from the bottom of the housing of the socket 16, a pin centered on the movement axis A, and a radial rib (not shown).

The blocking accessory 200 for its part is the shape of a sort of mushroom, with a stem (called the "engaging portion 201") that is intended to be placed in the socket 16, and a cap (called the "attaching portion 202") that is intended to be attached to the ophthalmic lens 100.

Its engaging portion 201 has an axisymmetric cylindrical shape of diameter and height equal to the diameter and to the depth of the housing defined by the socket 16. It furthermore has, on the side of its lower face, reliefs that allow the orientation of the blocking accessory 200 to be easily determined and that are designed to interact with the reliefs provided at the bottom of the housing defined by the socket 16. It is here a question of a central hole and of a radial groove. In this way, the blocking accessory 200 may be precisely held by the socket 16, in a known position and with a known orientation.

The fastening portion 202 of the blocking accessory 200 for its part is the shape of a curved disk, which disk is suitable for being attached to the ophthalmic lens 100 via its upper face, for example by means of a double-sided adhesive.

In the centering-blocking apparatus 1, as FIG. 2 clearly shows, the holder 20 includes a cylindrical tube 21 that has an upper end edge via which it is suitable for receiving the ophthalmic lens 100.

This cylindrical tube 21 is positioned around the movement axis A1, in such a way that it encircles the vertical shaft 31 and lies a distance away from the blocking accessory 200.

It has a shape that is axisymmetric about the movement axis A1, and that has a diameter of about 4 centimeters. It has right upper and lower end edges that lie in planes that are orthogonal to the movement axis A1.

The bearing plane P1, on which the holder 20 accommodates the ophthalmic lens 100, is therefore defined as being the plane in which the upper end edge of the cylindrical tube 21 lies.

As a variant, the upper end edge of the cylindrical tube could comprise three protruding pins forming a tripod for accommodating the ophthalmic lens (in which case the bearing plane P1 would be the plane passing through the upper ends of these three pins).

Preferably, most of the holder 20 is produced from a transparent material, so that the entirety of the lens may be correctly illuminated from below, through the holder 20. Here, the cylindrical tube 21 is produced from a single part made of transparent plastic.

However, this cylindrical tube 21 has, on its upper end edge, a coating 22 made of an anti-slip and anti-scratch material (made of rubber for example).

This coating 22 has a sufficiently high coefficient of static friction to ensure the ophthalmic lens 100 remains stationary on the holder 20 when the holder 20 moves from its centering position to its blocking position.

However, the coefficient of static friction of this coating 22 is not too high in order to make it possible for the optician to be able to smoothly slide the ophthalmic lens 100 over the holder 20 (in the bearing plane P1) manually.

Here, and preferably, the ophthalmic lens 100 is intended to be blocked manually. In other words, the holder 20 is not automated.

An elastic element 25 that is suitable for automatically returning the holder 20 to the centering position is thus provided. The stiffness of this elastic element 25 is however chosen such that it is possible for the optician to manually push the holder 20 into the blocking position or into the loading position.

In practice, the lower end of the cylindrical tube 21 is engaged in the duct 17, thereby allowing it to be guided during its translation between its various blocking, loading and centering positions. The lower end of the cylindrical tube 21 is moreover forcibly engaged in a sleeve tube 18 that slides along the vertical shaft 31, thereby allowing the precision of the translational guidance of the holder 20 along the movement axis A1 to be improved.

The elastic element 25 is then formed by a compression spring that is interposed between, on one side, the bottom 13 of the dome 11, and, on the other, the lower face of this sleeve tube 18.

Optionally, provision will also possibly be made for stopping means against which the holder 20 would abut in the centering position, to prevent the cylindrical tube 21 from being extracted from the duct 17.

Optionally, provision will also possibly be made for locking means allowing the holder 20 to be temporarily blocked in the loading position, in order to facilitate the loading of the blocking accessory 200 into the socket 16.

The centering means 40 are for their part designed to determine the position of the optical frame of reference of the ophthalmic lens 100.

As FIG. 2 shows, these centering means 40 include at least first means 50 for illuminating the ophthalmic lens 100 and means 60 for viewing the ophthalmic lens 100 illuminated by the first illuminating means 50. They here furthermore include second illuminating means 53.

To center the ophthalmic lens, only the first illuminating means 50, which are located opposite the viewing means 60 with respect to the ophthalmic lens 100, are used.

As will be described in more detail below in the rest of the description, when it is desired to acquire the outline of the ophthalmic lens 100 placed on the holder 20, the second illuminating means 53 (which are located on the same side as the viewing means 60 with respect to the ophthalmic lens 100) will possibly be used, in combination with a retractable backscattering accessory.

The first lighting means 50 are distributed all around the holder 20, so as to generate light of grazing incidence on the edge face of the ophthalmic lens 100 and on the optical face of the lens that is placed on the holder 20 (here on the convex front face 101).

These first illuminating means 50 in this instance include a plurality of light-emitting diodes 51, 52 that are regularly distributed around the holder 20.

Among these light-emitting diodes 51, 52, some generate light in the visible domain and others generate light in the infrared domain.

These light-emitting diodes 51, 52 here protrude from the internal face of the sidewall of the dome 11, under a rim formed by the dome 11 around the large circular aperture 12. In this way, the light-emitting diodes 51, 52 are not directly visible by the viewing means 60, thereby preventing any blooming affecting these viewing means 60.

As FIGS. 1 and 2 show, the chassis 10 includes an arm 19 that lies above the dome 11, that is fixed with respect to the latter and that houses the viewing means 60.

These viewing means 60 comprise a mirror 63 that is inclined at 45° with respect to the movement axis A1 and that allows the image of the ophthalmic lens 100 to be redirected toward the objective 61 of a digital video camera 62. This mirror 63 allows the centering-blocking apparatus 1 to be made more compact.

The optical path traced by the rays from the lens to the objective of the digital video camera 62 is comprised between 15 and 40 centimeters (it is here equal to 28 centimeters).

The digital video camera 62 is then designed to acquire an image of the ophthalmic lens 100 and to transmit it to a viewing screen 70 that is oriented toward the face of the optician.

Thus, the optician may observe in real-time on this viewing screen 70 the image of the ophthalmic lens 100, in which the ink markings provided on the lens clearly appear. A reticle, i.e. fixed coordinate systems that indicate the position and orientation of the blocking accessory 200, also clearly appears on this viewing screen 70. The centering operation will then consist, for the optician, in moving the ophthalmic lens 100 so as to superpose the markings of the lens with the reticle.

The digital video camera 62 is intended to acquire images in the infrared domain, thereby allowing the optician to more clearly observe the ophthalmic lens 100, especially when the latter is tinted. Specifically, the degree of transmission of tinted lenses is generally higher in the infrared domain than in the visible domain.

To decrease as much as possible parasitic scattering due to the installed illuminating means 51, 52 from the false bottom 14 and to make the markings of the lens standout, the false bottom 13 of the dome 11 is coated, on its upper face, with a dark coating that reflects less than 80% of the light that it receives. It is here a question of a coat of black paint.

The arm 19 of the chassis 10 also houses, between the mirror 63 and the digital video camera 62, a half-silvered mirror 64 that is inclined at a right angle to the mirror 63.

It also houses the second illuminating means 53, which are here formed by a light-emitting diode that emits light toward the ophthalmic lens 100 via the half-silvered mirror 64 and the mirror 63.

Contrary to the light-emitting diodes 51, 52 that illuminate the ophthalmic lens 100 from below, these second illuminating means 53 illuminate the ophthalmic lens 100 from above.

As was specified above, a retractable backscattering accessory, which is suitable for being placed by the optician between the holder 20 and the ophthalmic lens 100, is also provided.

This accessory (not shown in the figures) here takes the form of a plate equipped with a backscatterer to be placed under the ophthalmic lens 100 or of a template representing the shape of the ophthalmic lens 100, in order to allow the digital video camera 62 to clearly distinguish the shape of the outline of this lens. This accessory is more specifically used in the case where it is desired to detect a shape.

To center and then block the ophthalmic lens 100, the centering-blocking apparatus 1 is used by the optician in the following way.

In a first step, the optician loads a blocking accessory 200 into the socket 16, while taking care to ensure that its reliefs are correctly engaged in the corresponding reliefs of the socket 16, thereby ensuring that this blocking accessory 200 has the right orientation.

In a second step, the optician deposits the ophthalmic lens 100 on the holder 20, in such a way that the convex front face 101 of the lens bears against the coating 22 of this holder 20.

In a third step, he moves the ophthalmic lens transversely, i.e. by sliding it over the holder 20, until the ophthalmic lens 100 is placed on the axis of the blocking accessory 200, with a desired orientation. To do this, the optician observes the image of the ophthalmic lens 100 on the viewing screen 70, which image is displayed in superposition with the reticle. The optician then seeks in this step to superpose the markings of the ophthalmic lens 100 with the reticle.

Once this position has been reached, the optician presses the ophthalmic lens 100 downward, while taking care not to move it transversely, so as to lower the holder 20 while compressing the compression spring 25. This operation allows the lens to bear against the double-sided self-adhesive provided on the blocking accessory 200. In this way, the latter automatically bonds to the lens, in a desired position (with a precision better than half a millimeter) and with a desired orientation (with a precision better than a degree).

The present invention is in no way limited to the embodiment described and shown, and a person skilled in the art will be able to apply any variant thereto in accordance with the spirit thereof.

In particular, provision will possibly be made for the viewing means (60) to include a simple sighting eyepiece through which the optician will possibly observe the lens in superposition with a reticle engraved in the eyepiece.

As yet another variant, provision will possibly be made to automate the blocking operation, by equipping the holder with a pneumatic or mechanical maneuvering mechanism, and by equipping the centering-blocking apparatus with electronic means for controlling this maneuvering mechanism.

In practice, provision could thus be made to attach to the holder a rack and to attach to the chassis an electric motor that engages with this rack in order to make the holder rise or fall.

More simply, provision could be made in the dome for a vacuum pump allowing the air present in the cylindrical tube to be evacuated, as this would allow the holder to be lowered into the blocking or loading position.

According to another variant of the invention, provision could be made for the holder to take a different form from that shown in the figures. It could thus take the form of a tripod mounted so as to be able to move translationally on the chassis.

According to another variant of the invention (not shown in the figures), provision could have been made for the cylindrical tube (21) to be fixedly mounted on the chassis, and for the vertical shaft (31) to be mounted on the chassis so as to be able to move, for example with a vertical translational movement.

In this variant, it will be necessary to provide means for actuating the vertical shaft, in order to allow it to rise toward the lens in the blocking position, or to fall back to the centering position. It will possibly also be a question of electromechanical means (such as a rack and pinion motor), or of exclusively mechanical means (with for example a return spring for repelling the shaft upward, means for blocking the shaft in a low position, and means for unlocking these blocking means, which are accessible to the optician).

The invention claimed is:

1. A centering-blocking apparatus comprising:
   a chassis,
   a holder, mounted on the chassis, which is configured to receive an ophthalmic lens,
   a blocker mounted on the chassis, the blocker being configured to receive a blocking accessory arranged to attach to the ophthalmic lens, and
   a centerer mounted on the chassis, the centerer including an objective for sighting the ophthalmic lens and which allow a frame of reference of the ophthalmic lens to be viewed,
   wherein the blocker and the holder are mounted so as to be able to move one with respect to the other, between a centering position in which the ophthalmic lens received in the holder is located a distance away from the blocking accessory, and a blocking position in which the ophthalmic lens received in the holder bears against the blocking accessory received in the blocker, and
   wherein the blocker is located such that the blocking accessory remains in an image field of said sighting objective regardless of a relative position of the blocker with respect to the holder.

2. The centering-blocking apparatus as claimed in claim 1, wherein the blocker is fixedly mounted on the chassis, and the holder is movably mounted on the chassis.

3. The centering-blocking apparatus as claimed in claim 2, wherein said holder is mounted on the frame so as to be translationally movable along a movement axis.

4. The centering-blocking apparatus as claimed in claim 3, wherein said holder defines a bearing plane for the ophthalmic lens, and the centerer allows the ophthalmic lens borne by the holder to be observed along a viewing axis that is transverse to said bearing plane and that is parallel to said movement axis.

5. The centering-blocking apparatus as claimed in claim 2, further comprising an elastic element that is configured to automatically return the holder to the centering position, wherein a stiffness of the elastic element is configured for manually pushing the holder into its blocking position.

6. The centering-blocking apparatus as claimed in claim 2, further comprising an electronic element that controls a mechanism for maneuvering the holder, the electronic element automatically controlling the movement of the holder between its centering position and its blocking position.

7. The centering-blocking apparatus as claimed in claim 2, wherein the holder is movable on the chassis into a loading position, which is located opposite the centering position with respect to the blocking position.

8. The centering-blocking apparatus as claimed in claim 1, wherein said holder defines a bearing plane for the ophthalmic lens, and said holder and said blocker are located on the same side of the bearing plane.

9. The centering-blocking apparatus as claimed in claim 1, wherein most of the holder is produced from a transparent material.

10. The centering-blocking apparatus as claimed in claim 1, wherein the holder includes a bearing zone for the ophthalmic lens, which is produced from an anti-slip and anti-scratch material allowing the ophthalmic lens to be fixedly maintained on the holder when the holder moves from the centering position to the blocking position.

11. The centering-blocking apparatus as claimed in claim 1, wherein, the holder defines a bearing plane for the ophthalmic lens, the sighting objective, which is located on a first side of the bearing plane, and first illuminator, which are located on the other side of the bearing plane.

12. The centering-blocking apparatus as claimed in claim 11, wherein the first illuminator is distributed all around the holder, so as to generate light of grazing incidence on one of the faces or on the edge face of the ophthalmic lens.

13. The centering-blocking apparatus as claimed in claim 11, wherein the first illuminator includes at least one source of light in the visible domain.

14. The centering-blocking apparatus as claimed in claim 11, wherein the first illuminator includes at least one source of light in the infrared domain.

15. The centering-blocking apparatus as claimed in claim 1, wherein, the holder defines a bearing plane for the ophthalmic lens, and the centerer includes, on one and the same side of the bearing plane, said sighting objective and second illuminator that illuminates the ophthalmic lens.

16. The centering-blocking apparatus as claimed in claim 15, further comprising a retractable backscattering accessory that is placed between the holder and the ophthalmic lens.

17. The centering-blocking apparatus as claimed in claim 1, wherein the includes a video camera connected to a screen visible to the user.

18. The centering-blocking apparatus as claimed in claim 3, further comprising an elastic element that is configured to automatically return the holder to the centering position, wherein a stiffness of the elastic element is configured for manually pushing the holder into its blocking position.

19. The centering-blocking apparatus as claimed in claim 4, further comprising an elastic element that is configured to automatically return the holder to the centering position, wherein a stiffness of the elastic element is configured for manually pushing the holder into its blocking position.

20. The centering-blocking apparatus as claimed in claim 3, further comprising an electronic element that controls a mechanism for maneuvering the holder, the electronic element automatically controlling the movement of the holder between its centering position and its blocking position.

\* \* \* \* \*